M. MISHEL.
WINDOW CLEANER'S PLATFORM.
APPLICATION FILED JUNE 18, 1912.
1,165,435.
Patented Dec. 28, 1915.
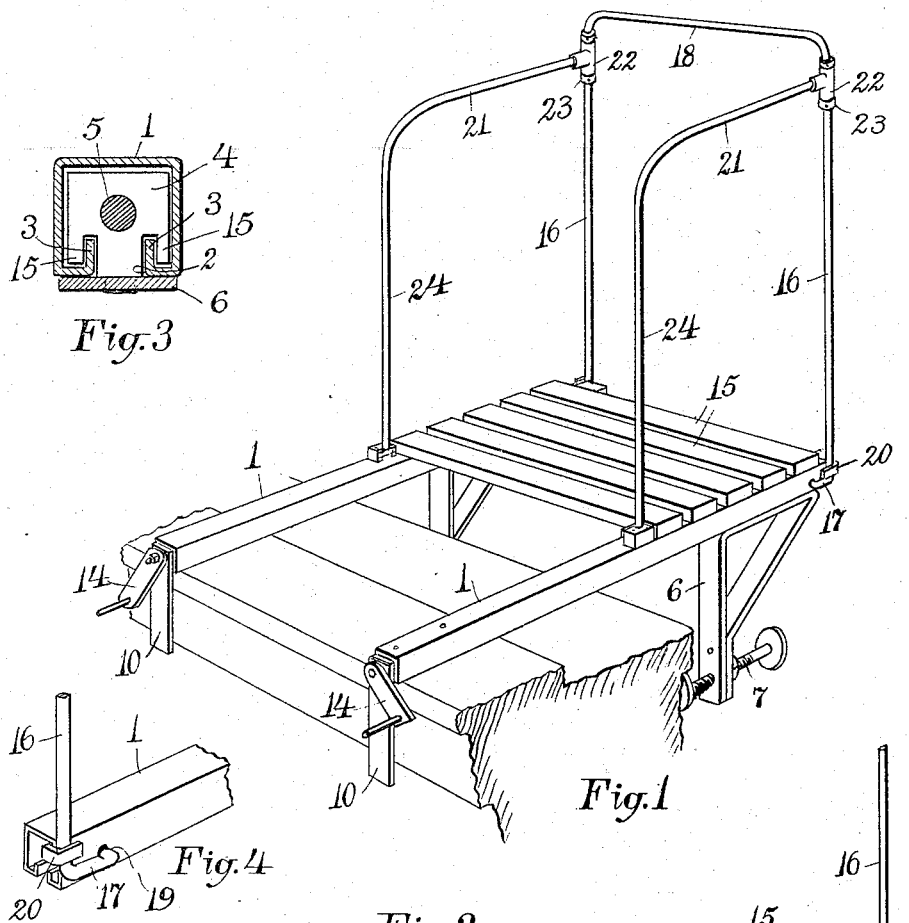
Witnesses:
Jacob Wasserman
Mark M. Horblit
Inventor,
Moses Mishel;
By A. B. Upham
Attorney.

UNITED STATES PATENT OFFICE.

MOSES MISHEL, OF REVERE, MASSACHUSETTS.

WINDOW-CLEANER'S PLATFORM.

1,165,435.  Specification of Letters Patent.  Patented Dec. 28, 1915.

Application filed June 18, 1912. Serial No. 704,321.

*To all whom it may concern:*

Be it known that I, MOSES MISHEL, a citizen of the United States, and a resident of Revere, in the county of Suffolk and Commonwealth of Massachusetts, have invented certain new and useful Improvements in Window-Cleaners' Platforms, of which the following is a full and exact description.

This invention relates to removable platforms designed to be supported on the sills of windows for the purpose of sustaining those engaged in cleaning the latter; and the invention consists in the construction of improved means for adjusting the fastening devices of the platform in order better to fit different thicknesses of walls; second, to improved guards for protecting the cleaners against falling, and to certain improvements in details of construction hereinafter set forth.

Referring to the drawings forming part of this specification, Figure 1 is a perspective view of a platform embodying my improvements, showing the same resting upon a window sill. Fig. 2 is a side sectional view of one of the main beams of the platform. Fig. 3 is a cross section of such beam, but drawn upon a larger scale. Fig. 4 is a perspective view of the rear end of one of said beams, showing the application thereto of a guard-post. Fig. 5 is a perspective view of a fastening device for the foot of another guard post, and Fig. 6 is a view of the foot of such post.

There are two main beams composing the principal part of the platform, each beam being preferably of sheet metal bent to form a hollow square in cross section, as shown in Fig. 3, but with the under side longitudinally open or slotted. The reference numeral 1 designates such beam. Along the edges of said opening or slot 2 are upstanding flanges 3, and loosely fitted to said slot and flanges is a block 4 having a threaded hole through it for the reception of the longitudinally disposed screw rod 5. There may be two of said blocks 4 in each beam, said blocks being rigidly fastened to a knee 6, which is preferably formed by bending up a suitable length of bar iron. By turning the rod 5, said knee is advanced toward, or moved away from, the outer face of the wall in which is the window to be cleaned. Each of said knees carries a large set screw 7, although in view of the action of the screw rods 5 such set screws are seldom used and can be replaced by a simple projection adapted to reach the surface of the wall beneath the window ledge.

At the inner end of each beam is an elbow 10, the arm 11 of which is located within the beam and riveted to the latter's upper side, as shown in Fig. 2. These elbows are preferably provided with pads 12 to shield the window sills from injury, as are also the under surface of part of each beam 1, as at 13. By turning the screw rods 5, the wall beneath the window receiving the support is tightly clamped between the set screws 7 and said elbows, and the platform suitably sustained. I find that when said screw rods are strongly turned to tighten such clamping action, even when the outer end of the platform is originally substantially lower than the inner end, the set screws are so much farther from the beams than are the points where the elbows rest against the window sill edge, that said outer ends will forcibly rise, the set screws slipping along the wall, until the platform is level, and will remain so under the weight of the window cleaner. For thus rotating the screw rods, the inner end of each is provided with a crank arm 14 rigidly fixed thereto.

One or both of the blocks 4 is formed with ears 15 adapted to engage the flanges 3, as shown in Fig. 3, for insuring that the powerful downward pull given to the block nearer the wall shall not spread the sides of the sheet metal beams 1 and so be drawn out from the same.

The window cleaners stand upon the cross slats 15 which are riveted or otherwise secured upon the main beams 1, and by which the latter are made a strongly united structure.

The guard, by which the window cleaners are kept from accidentally stepping off from the platform, is in three sections, the back section comprising a length of tubing or other rod 18, the uprights 16 of which are terminally pivoted to the rear extremities of the beams 1. For such purpose, each upright is given two bends to form an offset section 17 and a pivotal section 19, the latter loosely penetrating the said beam laterally, and the offset section enabling the back guard to swing down upon the platform. By means of the member 20 riveted to each beam and adapted to receive the upright 16 therein when swung to the vertical position, the rear guard 18 is strongly braced both rearwardly and laterally, as shown in Fig. 1, while still being permitted to be swung forward and down upon the platform.

For the lateral guards or wings, I provide an L-shaped rod whose horizontal arm 21 is tapped into the T whose longer portion 22 turns freely upon an upright 16, but is held from vertical displacement thereon by small collars 23 fastened on the uprights.

The foot of each vertical section 24 is formed with a head 25 (Fig. 6) adapted to come in the undercut beneath the notch 26 (Fig. 5) of the block 27 fastened to a main beam 1, said block having a latch 29 pivoted thereto for the purpose of locking the head in place. By turning said latches upward and withdrawing the headed ends of the vertical sections 24 from said blocks, the wing sections can be swung into the same plane with the back section, and then all three sections of the guard can be laid over flat upon the platform. When up in position, the guards serve the added function of bracing the rear guard section.

What I claim as my invention and for which I desire Letters Patent is as follows, to wit:—

A window cleaner's platform comprising a pair of main beams each consisting of a length of sheet metal folded longitudinally to compose a hollow rectangular member wholly inclosed except a longitudinal flanged slot in its under side, two blocks slidable within each beam and fitted to said flanged slot, a threaded hole being formed in each block, a threaded rod within each beam engaging the blocks therein, exterior means for turning said rods, and an elbow fixed to each beam, each pair of blocks having a knee connected therewith through said slot, said knee consisting of a length of metal bar bent into a triangular shape with its ends united, and having each two of said blocks fastened thereto near opposite ends of the base of the knee.

In testimony that I claim the foregoing invention, I have hereunto set my hand this 14th day of June, 1912.

MOSES MISHEL.

Witnesses:
A. B. UPHAM,
H. L. WHITTLESEY.